(12) United States Patent
Bart et al.

(10) Patent No.: US 8,051,952 B2
(45) Date of Patent: Nov. 8, 2011

(54) DEOILING DEVICE AND TURBOMACHINE COMPRISING THIS DEVICE

(75) Inventors: Jacques Rene Bart, Soisy sur Seine (FR); Jacky Raphael Michel Derenes, Corbeil-Essonnes (FR); Stephane Rousselin, Hericy (FR)

(73) Assignee: Snecma, Paris (FR)

( * ) Notice: Subject to any disclaimer, the term of this patent is extended or adjusted under 35 U.S.C. 154(b) by 509 days.

(21) Appl. No.: 12/359,558

(22) Filed: Jan. 26, 2009

(65) Prior Publication Data

US 2009/0191046 A1     Jul. 30, 2009

(30) Foreign Application Priority Data

Jan. 29, 2008   (FR) .................................... 08 50540

(51) Int. Cl.
*F02C 7/06* (2006.01)
(52) U.S. Cl. ..................... 184/6.11; 60/39.08
(58) Field of Classification Search .......... 184/6.4–6.26, 184/11.2; 415/111, 112, 175, 229, 169.2, 415/168.1, 168.4; 60/39.08
See application file for complete search history.

(56) References Cited

U.S. PATENT DOCUMENTS

| 4,683,714 A | * | 8/1987 | Thebert .......................... 60/772 |
| 5,114,446 A | * | 5/1992 | Giersdorf et al. ............... 55/345 |
| 5,201,845 A | | 4/1993 | Allmon et al. |
| 6,505,615 B2 | * | 1/2003 | Pietschner .................... 123/572 |
| 7,377,110 B2 | * | 5/2008 | Sheridan et al. ................ 60/772 |
| 7,566,356 B2 | * | 7/2009 | Latulipe et al. ................. 55/400 |

FOREIGN PATENT DOCUMENTS

| EP | 0 780 546 A1 | 6/1997 |
| EP | 1 582 703 A2 | 10/2005 |
| EP | 1 630 358 A2 | 3/2006 |
| EP | 1 840 028 A1 | 10/2007 |

* cited by examiner

*Primary Examiner* — Gary F. Paumen
(74) *Attorney, Agent, or Firm* — Oblon, Spivak, McClelland, Maier & Neustadt, L.L.P.

(57) ABSTRACT

The invention relates to a deoiling device. It comprises a tube (46), a first bearing (16) and a second bearing (18), the first and second bearings being placed in an oil chamber (20) in which an oil fog is maintained by rotation of the bearings. A deoiler (30) is provided in one wall of the oil chamber. The deoiler centrifuges oil in suspension in air and allows a deoiled air flow to pass inside the tube. The tube (46) comprises a closing cap (48) fitted with one or several outlet orifices (50) in its upper part designed to evacuate air, and an oil drain orifice (52) in its lower part.

6 Claims, 5 Drawing Sheets

DEOILING DEVICE AND TURBOMACHINE COMPRISING THIS DEVICE

The invention relates to a deoiling device comprising a tube, a first bearing and a second bearing, the first bearing and second bearings being placed in an oil chamber in which an oil fog is maintained, a deoiler being provided in one wall of the oil chamber, the deoiler centrifuging oil in suspension in air and allowing a deoiled air flow to pass inside the tube.

On aircraft turbomachines, bearings are contained in containments that have the function of preventing lubrication oil from escaping into the engine. Lubrication of bearings causes a sustained oil fog due to the rotation of rotating parts.

Ventilation air circulates in the bearing containments. This air contains oil and must be deoiled before it leaves the containment. This is why a deoiler is provided. The deoiler may for example comprise a honeycomb structure on which oil droplets stick and are then expelled into the bearings containment by centrifuging.

However, the deoiler may become less efficient. This will be the case for example at a low engine rotation speed because the deoiler turns less quickly and consequently centrifuging is less efficient. It is also the case if the deoiling vents become dirty or if the containment cap lip seals are deteriorated. The deoiling vents are tubes for the evacuation of residual oil in the front containment by centrifuging.

In this case, oiled air goes as far as the sheet metal cone called the plug or central body that extends the turbomachine on the output side. This air is expelled in the lower part in the primary stream or directly into the plug. The consequences are dirt generated by oil on the plug and the outer nacelle. This dirt is unacceptable, particularly in business aviation in which the engines and especially the outside of the nacelle must remain perfectly clean.

This situation also increases oil consumption which is expensive for the engine user.

The purpose of this invention is a deoiling device that overcomes these disadvantages.

These purposes are achieved according to the invention by the fact that the tube comprises a closing cap fitted with one or several outlet orifices at its upper part designed to evacuate air, and a drain orifice in its lower part for the recovery of oil.

Due to these characteristics, oiled air strikes the closing cap. Oil droplets present in air stick on this cap and drop by gravity to the oil drain orifice. Deoiled air escapes through the upper part of the closing cap in which orifices are provided for this purpose.

Thus, perfectly clean air enters the primary stream or directly into the plug. This prevents the accumulation of dirt.

In one embodiment, the tube is composed of a low pressure shaft extended by a hollow shaft that fits onto the low pressure shaft. This embodiment mainly concerns small engines like those used in business aviation.

According to another embodiment, the tube is composed of a central ventilation tube.

This embodiment relates to larger engines such as those used in commercial aviation. These engines are sufficiently large so that a central ventilation tube can be fitted in them.

Advantageously, the oil drain orifice is connected through a pipe to an oil recovery reservoir.

Secondly, the invention relates to a double flow turbomachine comprising a primary flow and a secondary flow and comprising a deoiling device. The air outlet orifices are extended by ducts that bring air into the primary flow of the turbomachine.

In another embodiment, the invention relates to a turbomachine in which the outlet orifices are provided in the cap leading directly into the plug.

Other characteristics and advantages of this invention will become clear after reading the following description of an example embodiment given for illustrative purposes with reference to the appended figures. In these figures.

Figure 1:
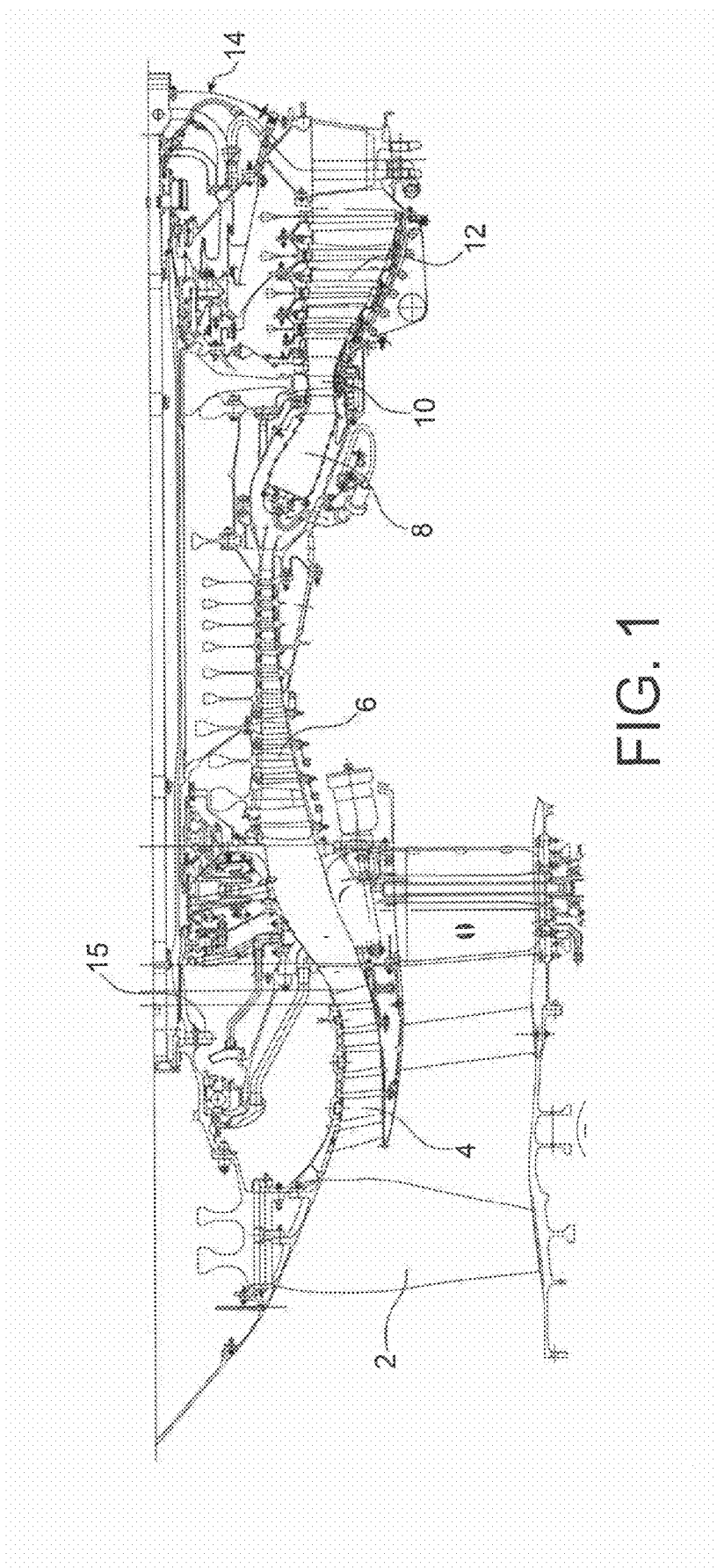
FIG. 1 shows a general sectional view of a turbojet.

FIG. 1 shows a general view of an aircraft turbojet in which the invention could be used. Starting from the forward end and working in the aft direction, this comprises a fan 2, a low pressure compressor 4, a high pressure compressor 6, a combustion chamber 8, a high pressure turbine 10 and a low pressure turbine 12. Reference 14 denotes the zone concerned by the invention, which is shown in more detail in FIG. 2. Reference 15 denotes a deoiling vent.

Figure 2:
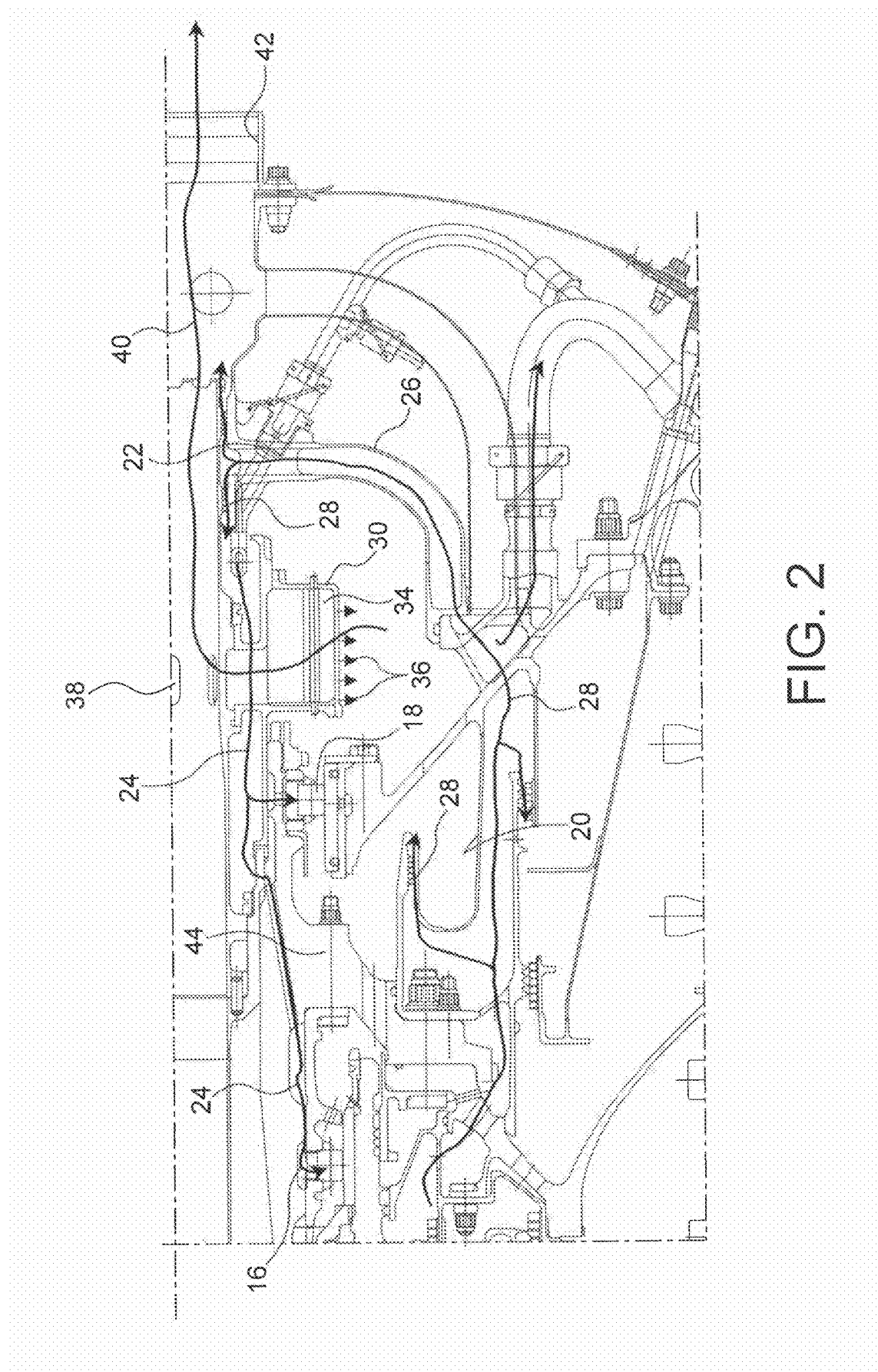
FIG. 2 shows a sectional view of a deoiling device according to prior art.

Reference 16 in FIG. 2 denotes a first bearing, and reference 18 denotes a second bearing. Bearings 16 and 18 are located inside a containment 20 forming an oil chamber. Bearings 16 and 18 are lubricated by a lubrication oil flow from a sprinkler 22 shown diagrammatically by arrows 24. Rotation of bearings 16 and 18 leads to an oil fog that fills the containment 20. The containment 20 is delimited by a pressurised containment cap 26. Pressurisation air enters into the chamber 20 as shown diagrammatically by arrows 28. A deoiler 30 is provided around the central ventilation tube 32. The deoiler 30 comprises a honeycomb structure 34 onto which fine oil droplets stick. Due to rotation of the deoiler, these fine droplets are ejected by centrifugal force as shown diagrammatically by arrows 36, while deoiled air passes through the deoiler and penetrates through orifices 38 inside the central ventilation tube 32. Deoiled air then passes through the central ventilation tube from the forward end in the aft direction as shown by arrow 40, and then penetrates into the plug after passing through the outlet orifice 42. Reference 44 denotes the low pressure shaft.

With such a device, if the deoiler 30 becomes less efficient, badly deoiled air passes through it and reaches the plug and is expelled in the lower part in the primary stream. This results in dirt generated by oil on the plug and the outer nacelle, which is not acceptable, particular in business aviation.

Figure 3:
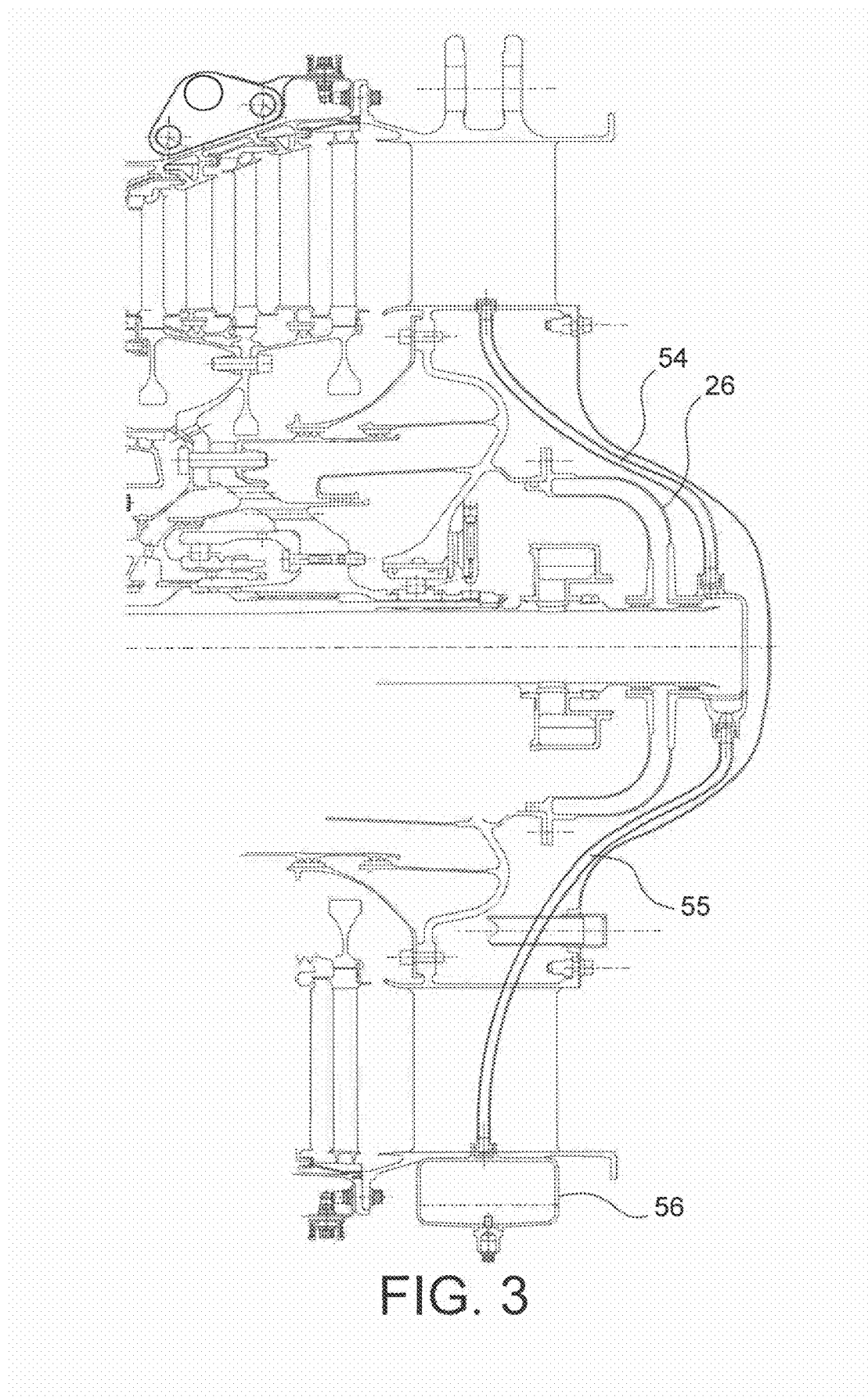
FIG. 3 shows a sectional view of a deoiling device according to this invention.
Figure 4:
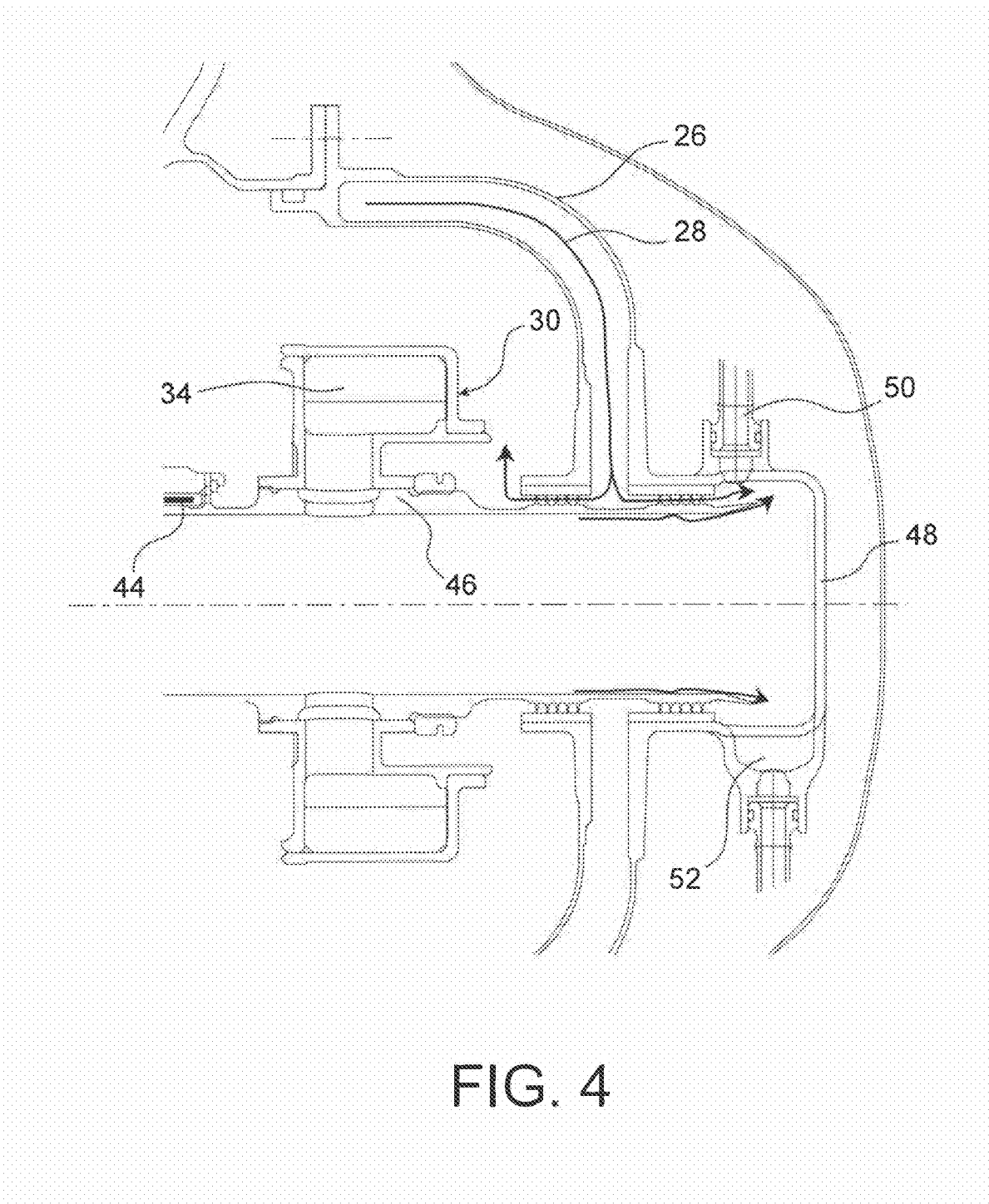
FIG. 4 shows an enlarged view of part of the deoiling device shown in FIG. 3.

FIGS. 3 and 4 show an example embodiment of a deoiling device according to this invention. Given that this device is intended to equip a small turbojet like a business aircraft, there is no room to house a central ventilation tube. This is why the low pressure shaft 44 is connected to a hollow shaft 46 that extends the low pressure shaft 44. According to this invention, a cap 48 is installed at the right end (according to FIGS. 3 and 4) of the hollow shaft 46. The deoiler 30 is mounted on the hollow shaft 46. The closing cap 48 is fitted with one or several outlet orifices 50 located in its upper part. It comprises a cavity 52 in its lower part through which oil drains. A duct 55 connects the cavity 52 to a small reservoir 56 used for oil recovery (FIG. 3).

The device operates as follows. Oiled air that has passed through the deoiler 30 comes into contact with the internal walls of the hollow shaft 46 because of the rotation of the hollow shaft. The oil droplets stick to the inside wall of the hollow shaft and they are centrifuged onto the closing cap 48 at the end of the hollow shaft. Deoiled air escapes through the outlet orifices 50 while oil concentrates in the cavity 52.

Orifices 50 may open up directly into the plug or the ducts 54 to transport deoiled air into the primary stream.

Figure 5:
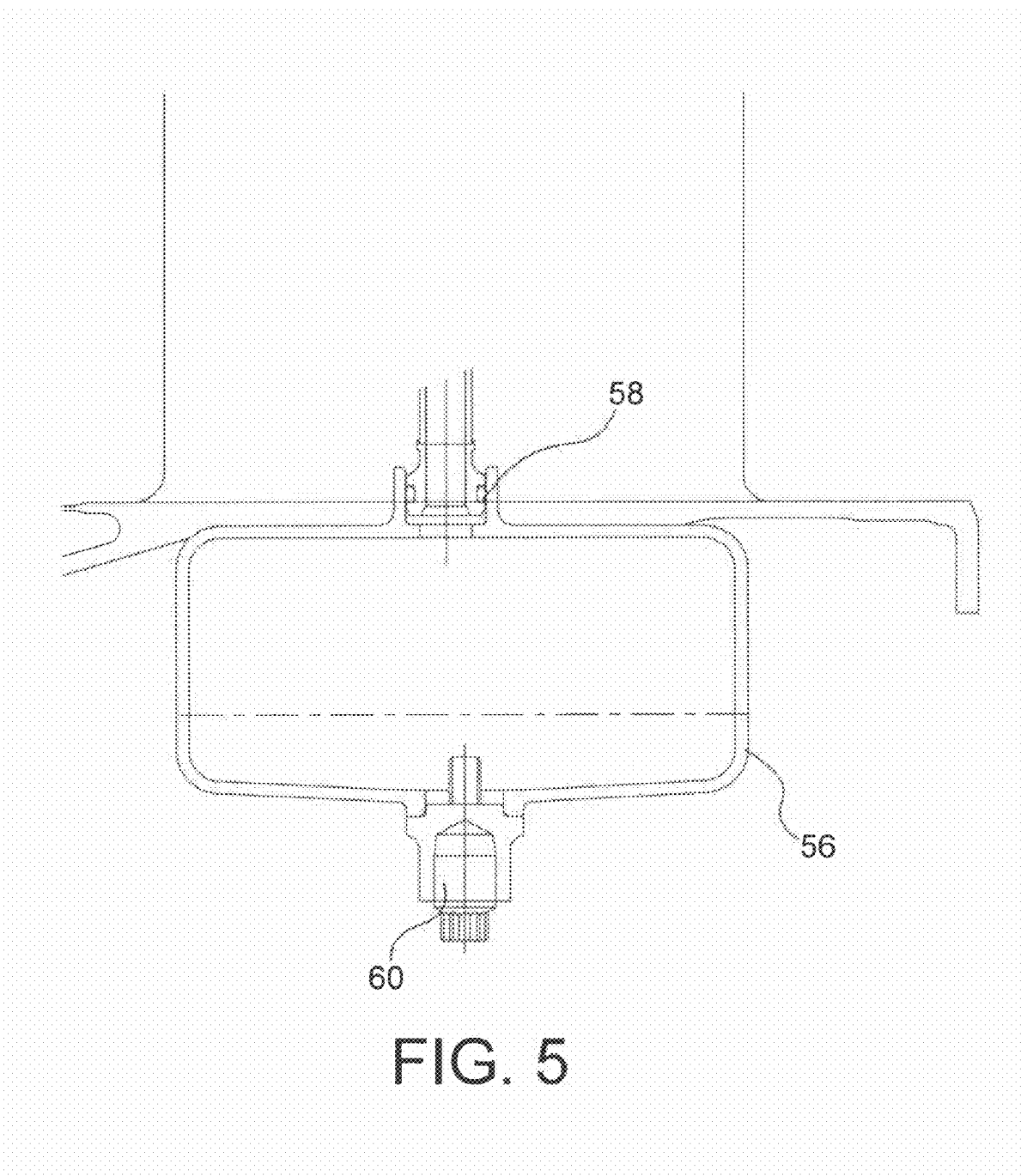
FIG. 5 shows a detailed view of the oil reception reservoir.

FIG. 5 shows a detailed view of the reservoir 56 that is used to collect oil. The reservoir is fixed onto the exhaust casing 57. It comprises a bushing 58 used to connect the pipe 55 and a plug 60 for draining the reservoir.

The invention claimed is:

1. Deoiling device comprising a tube (46), a first bearing (16) and a second bearing (18), the first and second bearings (16, 18) being placed in an oil chamber (20) in which an oil fog is maintained by rotation of the bearings, a deoiler (30) being provided in one wall of the oil chamber, the deoiler centrifuging oil in suspension in air and allowing a deoiled air flow to pass inside the tube (46), characterised in that the tube (46) comprises a closing cap (48) fitted with one or several outlet orifices (50) in its upper part to evacuate air and an oil drain orifice (52) in its lower part.

2. Deoiling device according to claim 1, characterised in that the tube is composed of a low pressure shaft (44) extended by a hollow shaft (46) that fits onto the low pressure shaft.

3. Deoiling device according to claim 1, characterised in that the tube is composed of a central ventilation tube (32).

4. Deoiling device according to any one of claims 1 to 3, characterised in that the oil drain orifice is connected through a pipe (55) to an oil recovery reservoir (56).

5. Double flow turbomachine comprising a primary flow and a secondary flow and comprising a deoiling device according to one of claims 1 to 3, characterised in that the air orifices (50) are extended by ducts (54) that bring air into the primary flow of the turbomachine.

6. Turbomachine comprising a plug and comprising a deoiling device according to one of claims 1 to 3, characterised in that the outlet orifices (50) provided in the cap (48) open up directly in the plug.

* * * * *